(12) United States Patent
Cheng

(10) Patent No.: US 6,823,907 B2
(45) Date of Patent: Nov. 30, 2004

(54) WORK TABLE WITH A SAWDUST COLLECTING MECHANISM

(76) Inventor: Meng-Chieh Cheng, No. 169, Chung-Shan Rd., Fengyuan City, Taichung Hsien (TW)

( * ) Notice: Subject to any disclaimer, the term of this patent is extended or adjusted under 35 U.S.C. 154(b) by 4 days.

(21) Appl. No.: 10/241,427

(22) Filed: Sep. 10, 2002

(65) Prior Publication Data
US 2003/0217626 A1 Nov. 27, 2003

(30) Foreign Application Priority Data
May 21, 2002 (TW) ........................... 91207284 U

(51) Int. Cl.⁷ .................... B27D 7/18; B27G 21/00
(52) U.S. Cl. ............... 144/286.1; 144/252.1; 144/286.5; 83/100; 451/453; 451/456
(58) Field of Search ............... 83/98, 99, 100; 144/87, 88, 252.1, 252.2, 286.1, 286.5, 287; 409/253; 451/453, 456; 55/DIG. 18

(56) References Cited
U.S. PATENT DOCUMENTS

| | | | | |
|---|---|---|---|---|
| 3,672,292 A | * | 6/1972 | Arnold | 454/49 |
| 3,882,598 A | * | 5/1975 | Earle et al. | 451/456 X |
| 4,325,292 A | * | 4/1982 | McNinney et al. | 451/453 |
| 4,333,745 A | * | 6/1982 | Zeanwick | 451/453 X |
| 4,408,642 A | * | 10/1983 | Jeruzal et al. | 144/286.5 |
| 4,932,449 A | * | 6/1990 | Omoto | 451/453 X |
| 5,582,225 A | * | 12/1996 | Schank | 144/286.1 |
| 5,984,990 A | * | 11/1999 | McDonald | 55/DIG. 18 X |
| 6,557,602 B1 | * | 5/2003 | Sorensen et al. | 144/286.5 |

\* cited by examiner

*Primary Examiner*—Clark F. Dexter
(74) *Attorney, Agent, or Firm*—Townsend and Townsend and Crew LLP

(57) ABSTRACT

A work table includes a workpiece-supporting box having a bottom plate formed with an outlet port connected to a suctioning device, and a peripheral wall. Left and right guide plates extend inclinedly and downwardly from the peripheral wall toward the outlet port, and have opposing end walls distal from the peripheral wall. A distributor member is disposed between the end walls, and cooperates with the bottom plate to define a lower chamber in fluid communication with the outlet port, and further cooperates with the guide plates and the peripheral wall to define an upper chamber. A working panel is mounted on the peripheral wall, and is formed with apertures for access to the upper chamber.

3 Claims, 4 Drawing Sheets

WORK TABLE WITH A SAWDUST COLLECTING MECHANISM

CROSS REFERENCE TO RELATED APPLICATION

This application claims priority of Taiwan Application No. 091207284, filed on May 21, 2002.

BACKGROUND OF THE INVENTION

1. Field of the Invention

The present invention relates to a work table, more particularly to a work table with a sawdust collecting mechanism.

2. Description of the Related Art

Referring to FIG. 1, a conventional work table is shown to include a stand 1, a workpiece-supporting box 2, a working panel 3, and a suctioning device 4.

As illustrated, the box 2 includes a bottom plate 201 that is disposed on the stand 1 and that has a peripheral edge, and a peripheral wall 202 that extends uprightly from the peripheral edge of the bottom plate 201 to define a receiving chamber 203. The bottom plate 201 is formed with an outlet port 204.

The working panel 3 is disposed on the peripheral wall 202 to cover the receiving chamber 203, and is formed with a plurality of equidistantly spaced apart apertures 303 that are in fluid communication with the receiving chamber 203.

The suctioning device 4 includes an air conduit 403, a blower unit 401, and a container 407. The air conduit 403 has a first end connected to the outlet port 204 of the box 2 and a second end connected to an inlet of the blower 401. The container 407 is connected to an outlet of the blower 401 via a piping in such a manner that when the blower 401 is actuated, sawdust resulting from an abrasive operation performed on the working panel 3 is collected in the container 407 via the apertures 303 in the working panel 3 and the outlet port 204 of the bottom plate 201. Preferably, an air-filtering bag 406 is mounted on a top end of the container 407 via a fastener belt 405 to enhance collection of the sawdust in the container 407.

One disadvantage of the aforementioned conventional work table resides in that since there is no sawdust guiding means provided in the receiving chamber 203 for guiding the sawdust toward the outlet port 204, the sawdust tends to accumulate at corners of the box 2.

SUMMARY OF THE INVENTION

Therefore, an object of this invention is to provide a work table having a sawdust collecting mechanism so as to eliminate the aforesaid disadvantage.

Accordingly, a work table of the present invention includes: a stand; a workpiece-supporting box having a bottom plate disposed on the stand and having a peripheral edge, and a peripheral wall extending upwardly from the peripheral edge of the bottom plate to define a receiving chamber, the bottom plate being formed with an outlet port; a sawdust collecting mechanism including opposing left and right guide plates extending inclinedly and downwardly from the peripheral wall toward the outlet port, the left and right guide plates having opposing end walls distal from the peripheral wall and cooperating with the bottom plate to define a groove that is in fluid communication with the outlet port, the sawdust collecting mechanism further including a distributor member disposed on the groove, cooperating with the bottom plate to define a lower chamber in fluid communication with the outlet port, and cooperating with the left and right guide plates and the peripheral wall to define an upper chamber above the upper chamber, the distributor member being formed with a plurality of equidistantly spaced apart entrance holes that fluidly communicate the upper and lower chambers; a working panel disposed on the peripheral wall, covering the upper chamber, and formed with a plurality of uniformly spaced apart apertures that are in fluid communication with the upper chamber; and a suctioning device including an air conduit connected to the outlet port of the box, and a container connected to the air conduit so as to collect sawdust in the container via the apertures in the working panel, the upper and lower chambers, and the outlet port of the box upon actuation of the suctioning device.

BRIEF DESCRIPTION OF THE DRAWINGS

Other features and advantages of this invention will become more apparent in the following detailed description of the preferred embodiment of this invention, with reference to the accompanying drawings, in which.

DESCRIPTION OF THE PREFERRED EMBODIMENTS

Figure 1:
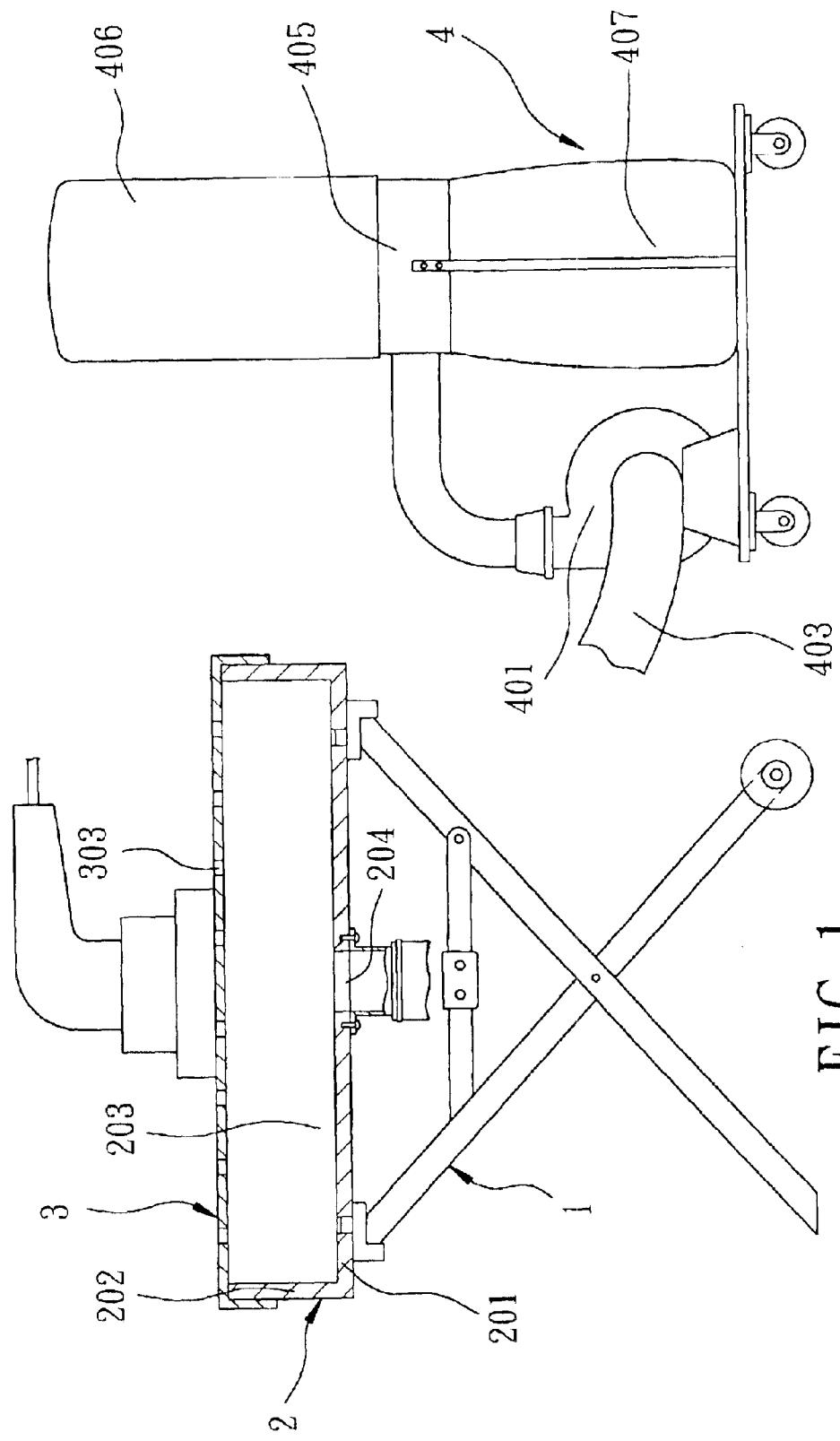
FIG. 1 is a schematic view of a conventional work table.
Figure 2:
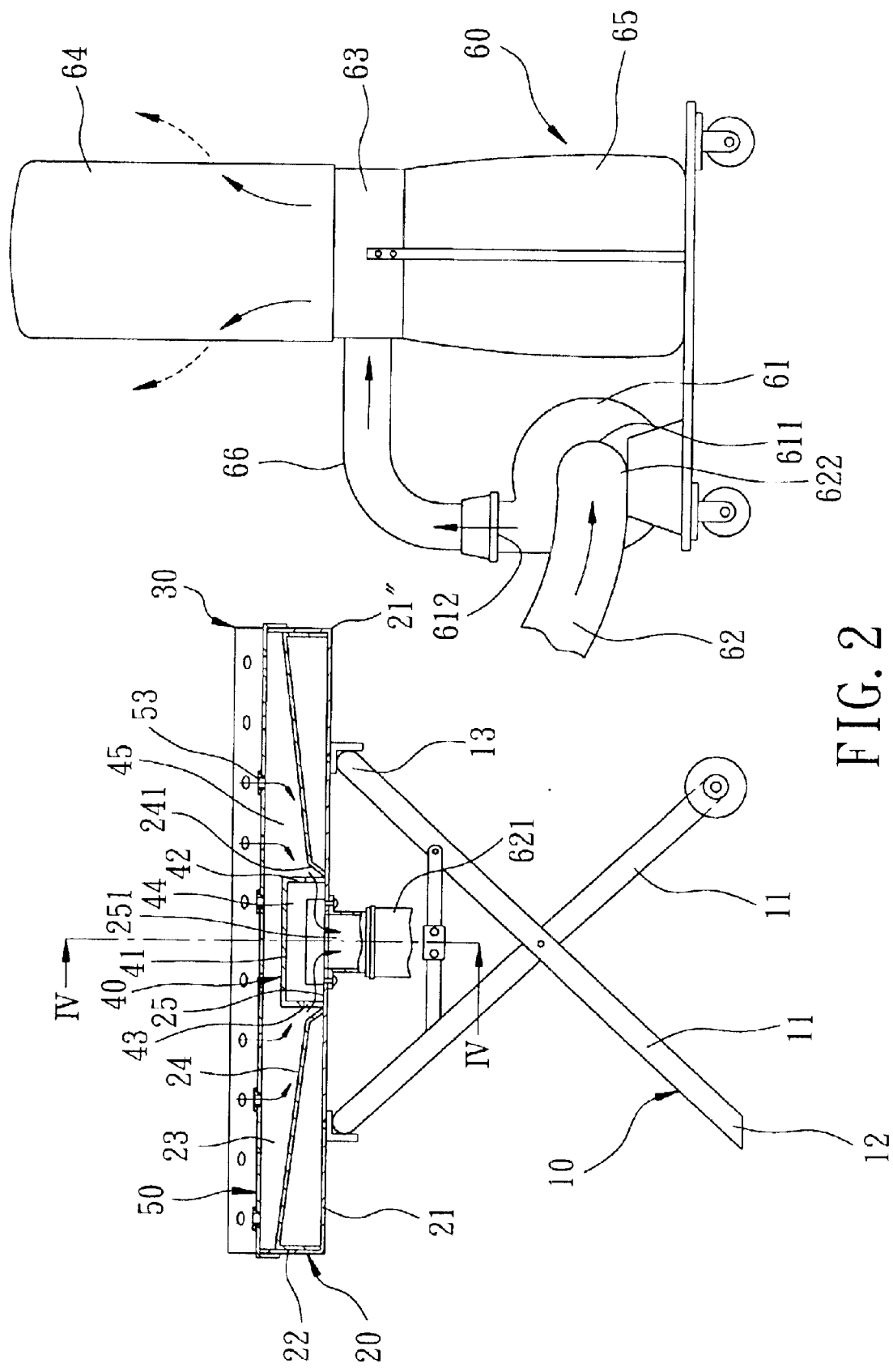
FIG. 2 is a schematic view of a preferred embodiment of a work table according to the present invention.
Figure 3:
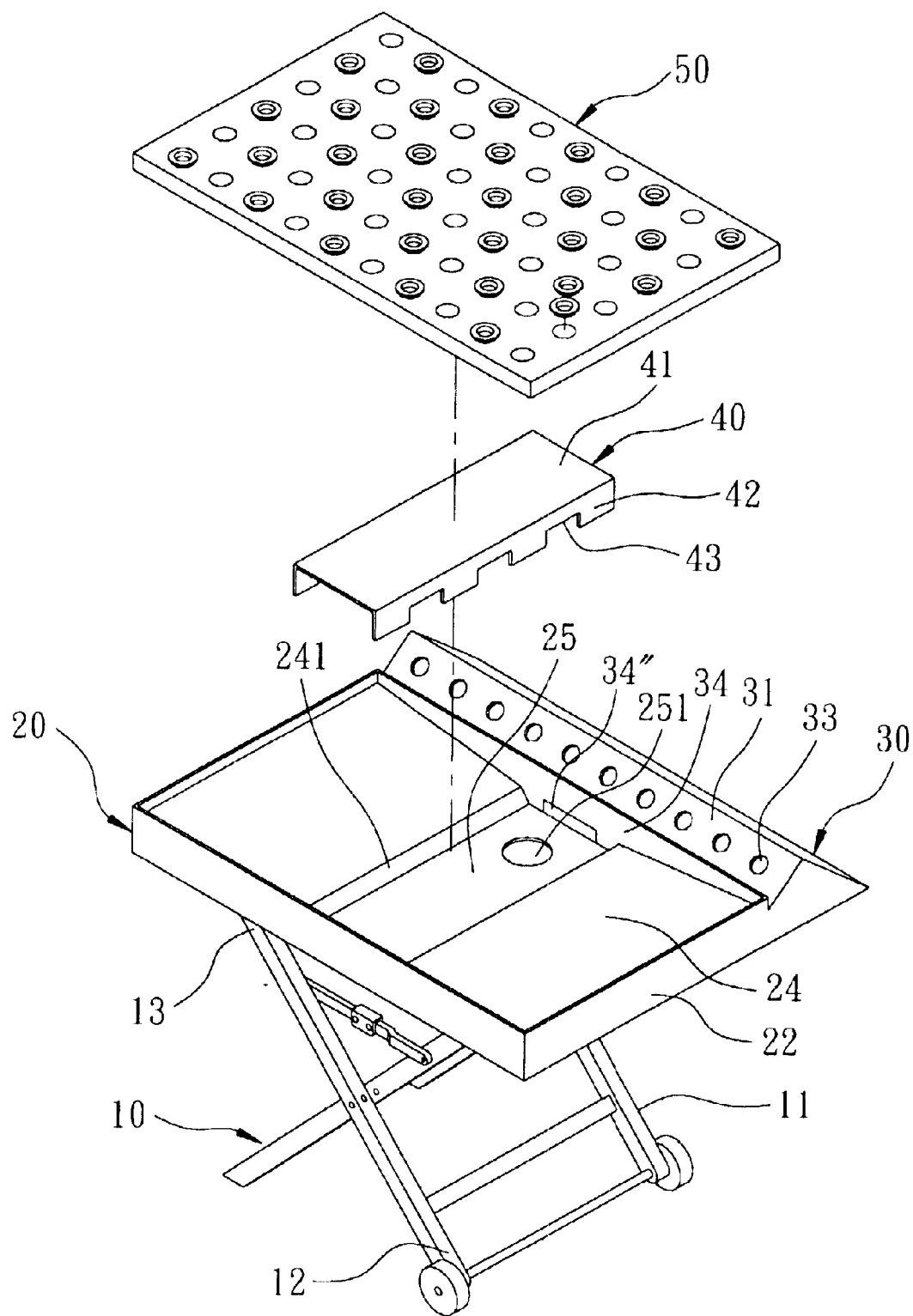
FIG. 3 is a partly exploded view of the preferred embodiment, illustrating how a sawdust collecting mechanism is mounted in a workpiece-supporting box of the preferred embodiment.
Figure 4:
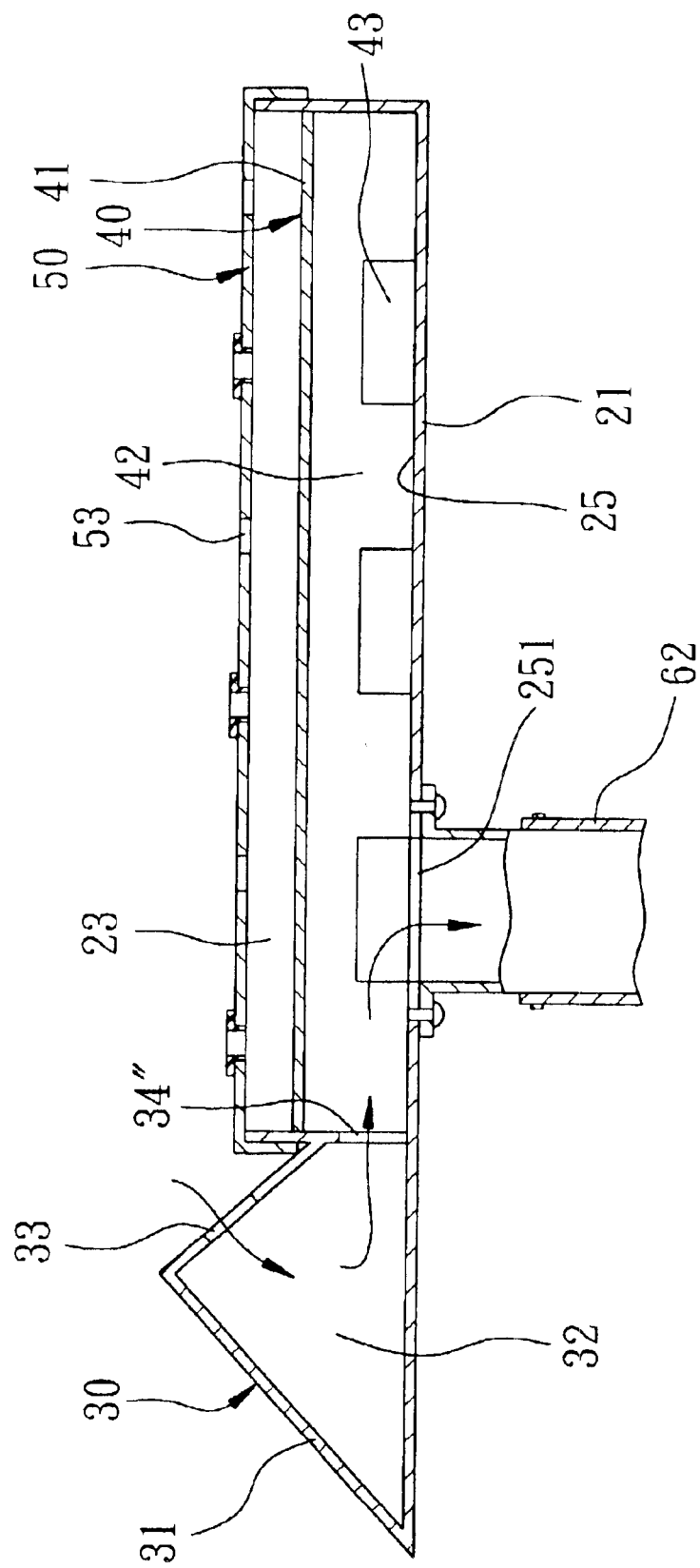
FIG. 4 is a cross-sectional view of the preferred embodiment taken along line IV—IV of FIG. 2.

Referring to FIGS. 2 to 4, the preferred embodiment of a work table according to the present invention is shown to include a scissors-like stand 10, a workpiece-supporting box 20, a sawdust collecting mechanism, and a suctioning device 60.

As illustrated, the stand 10 includes a pair of pivotally connected legs 11, and has a lower end 12 adapted to be disposed on a ground surface, and a top end 13.

The workpiece-supporting box 20 has a bottom plate 21 disposed on the top end 13 of the stand 10 and having a peripheral edge 21", and a peripheral wall 22 that extends upwardly from the peripheral edge 21" of the bottom plate 21 to define a receiving chamber 23. The bottom plate 21 is formed with an outlet port 251.

The sawdust collecting mechanism includes opposing left and right guide plates 24, a distributor member 40, and a working panel 50. The left and right guide plates 24 extend inclinedly and downwardly from the peripheral wall 22 toward the outlet port 251, and have opposing end walls 241 which are distal from the peripheral wall 22 and which cooperate with the bottom plate 21 to define a groove 25 that is in fluid communication with the outlet port 251. The distributor member 40 is disposed in the groove 25, and cooperates with the bottom plate 21 to define a lower chamber 44 that is in fluid communication with the outlet port 251. The distributor member 40 further cooperates with the left and right guide plates 24 and the peripheral wall 22 to define an upper chamber 45 above the lower chamber 44. The distributor member 40 is formed with a plurality of spaced apart entrance holes 43 that fluidly communicate the upper and lower chambers 44, 45. The working panel 50 is in the form of a horizontal plate, is disposed on the peripheral wall 22 to cover the upper chamber 45, and is formed with a plurality of equidistantly spaced apart apertures 53 that are in fluid communication with the upper chamber 45.

The suctioning device 60 includes an air conduit 62, a blower unit 61, and a container 65. The air conduit 62 has a first end 621 connected to the outlet port 251 of the box 20, and a second end 622 connected to an inlet 611 of the blower 61. The container 65 is connected to an outlet 612 of the blower 61 via a piping 66 in such a manner that when the blower 61 is actuated, sawdust resulting from an abrasive operation performed on the working panel 50 is collected in the container 65 via the apertures 53 in the working panel 50, the upper and lower chambers 44, 45, and the outlet port 251 of the bottom plate 21. Preferably, an air-filtering bag 64 is mounted on a top end of the container 65 via a fastener belt 63 to enhance collection of the sawdust in the container 65.

In this embodiment, the distributor member 40 has an inverted U-shaped cross-section, and includes a horizontal upper portion 41 disposed above the bottom plate 21, and left and right vertical portions 42 which extend downwardly and respectively from two opposite sides of the upper portion 41 to the bottom plate 21 and which are formed with the entrance holes 43 therethrough.

The workpiece-supporting box 20 is generally rectangular in shape. The peripheral wall 22 includes a front wall 34 that extends uprightly from the bottom plate 21 to define a front side of the receiving chamber 23. The work table according to the present invention further includes an auxiliary casing 30 that projects frontwardly from the front wall 34 and that has a roof 31 extending inclinedly and upwardly from the front wall 34 and formed with a plurality of entry through-holes 33 above the working panel 50. The auxiliary casing 30 defines a side chamber 32 in fluid communication with the entry through-holes 33. The front wall 34 is formed with a communication hole 34" that is in fluid communication with the lower chamber 44 and the side chamber 32 so as to provide an extra passage for collection of the sawdust via the through holes 33 and the communication hole 34".

With this invention thus explained, it is apparent that numerous modifications and variations can be made without departing from the scope and spirit of this invention. It is therefore intended that the invention be limited only as indicated in the appended claims.

I claim:

1. A work table comprising:
   a stand;
   a workpiece-supporting box having a bottom plate disposed on said stand and having a peripheral edge, and a peripheral wall extending upwardly from said peripheral edge of said bottom plate to define a receiving chamber, said bottom plate being formed with an outlet port;
   a sawdust collecting mechanism including
   opposing left and right guide plates extending inclinedly and downwardly from said peripheral wall toward said outlet port, said left and right guide plates each having an opposing end wall distal from said peripheral wall and cooperating with said bottom plate to define a groove that is in fluid communication with said outlet port,
   a distributor member disposed in said groove, cooperating with said bottom plate to define a lower chamber in fluid communication with said outlet port, and cooperating with said left and right guide plates and said peripheral wall to define an upper chamber above the lower chamber, said distributor member being formed with a plurality of spaced-apart entrance holes that fluidly communicate with said upper and lower chambers, and
   a working panel disposed on said peripheral wall, covering said upper chamber, and formed with a plurality of spaced-apart apertures that are in fluid communication with said upper chamber; and
   a suctioning device including an air conduit connected to said outlet port of said box, and a container connected to said air conduit so as to collect sawdust in said container via said apertures, said upper and lower chambers, and said outlet port of said bottom plate upon actuation of said suctioning device.

2. The work table as defined in claim 1, wherein said distributor member has an inverted U-shaped cross-section, and includes a horizontal upper portion disposed above said bottom plate, and left and right vertical portions which extend downwardly and respectively from two opposite sides of said upper portion to said bottom plate and which are formed with said entrance holes therethrough.

3. The work table as defined in claim 2, wherein said workpiece-supporting box is generally rectangular in shape, said peripheral wall including a front wall extending uprightly from said bottom plate to define a front side of said receiving chamber, said work table further comprising an auxiliary casing that projects frontwardly from said front wall and that has a roof extending inclinedly and upwardly from said front wall and formed with a plurality of entry through-holes above said working panel, said auxiliary casing defining a side chamber in fluid communication with said entry through-holes, said front wall being formed with a communication hole in fluid communication with said lower chamber and said side chamber.

* * * * *